United States Patent [19]

Smith

[11] Patent Number: 5,037,245
[45] Date of Patent: Aug. 6, 1991

[54] ARTICLE TRANSFER DEVICE AND METHOD FOR AIR CONVEYORS

[75] Inventor: Paul W. Smith, Forest, Va.

[73] Assignee: Simplimatic Engineering Company, Lynchburg, Va.

[21] Appl. No.: 488,610

[22] Filed: Mar. 2, 1990

[51] Int. Cl.⁵ .............................................. B65G 51/00
[52] U.S. Cl. ......................................... 406/88; 406/89
[58] Field of Search ....................... 406/86, 87, 88, 89, 406/90, 91, 92, 181

[56] References Cited

U.S. PATENT DOCUMENTS

| | | | |
|---|---|---|---|
| 3,469,887 | 9/1969 | Nakahara et al. | 406/88 |
| 3,614,168 | 8/1971 | Range | 406/181 |
| 3,948,564 | 4/1976 | Flint | 406/88 |
| 3,999,806 | 12/1976 | Hurd | 406/181 |
| 4,191,499 | 3/1980 | Futer | 406/88 |
| 4,392,760 | 7/1983 | Futer . | |
| 4,500,229 | 2/1985 | Cole et al. . | |
| 4,568,223 | 2/1986 | Lenhart . | |
| 4,655,677 | 4/1987 | Lenhart | 406/88 |
| 4,730,956 | 3/1988 | Lenhart | 406/88 |

Primary Examiner—Sherman Basinger
Assistant Examiner—Stephen P. Avila
Attorney, Agent, or Firm—St. Onge Steward, Johnston & Reens

[57] ABSTRACT

A device and method are provided for transferring articles to and from an air conveyor. The device comprises a first plenum chamber, a second plenum chamber, and an air supply. The first plenum chamber has a transfer surface with a first plurality of perforations for directing air toward the air conveyor. The second plenum chamber is located at least above a portion of the air conveyor and has a plate with a second plurality of perforations for directing air away from the air conveyor. The air supply supplies air to the first plenum chamber to keep articles going down the air conveyor and to feed articles onto the air conveyor, and supplies air to the second plenum chamber to transfer articles off of the air conveyor.

24 Claims, 5 Drawing Sheets

ARTICLE TRANSFER DEVICE AND METHOD FOR AIR CONVEYORS

FIELD OF THE INVENTION

This invention relates to air conveyor systems and, more specifically to devices and methods for transferring articles to and from an air conveyor.

BACKGROUND OF THE INVENTION

Air conveyor systems currently are among the most convenient and reliable means of moving articles, especially empty packages and containers such as cans, from one workstation to another in any of a variety of industrial plants. Typically, an article in such an industrial plant undergoes a variety of processing steps at a number of different workstations which may be connected by air conveyors. In this regard, a number of circumstances arise wherein articles need to be transferred to or from an air conveyor. A prevalent prior art device for transferring articles is a mechanical arm or gate. One disadvantage of mechanical arms is their inherent unreliability due to the moving parts therein. Another disadvantage of prior art mechanical arms is that as they maneuver into position to transfer articles they may damage articles.

SUMMARY OF THE INVENTION

It is accordingly an object of this invention to provide a method and device for transferring articles to and from an air conveyor. It is another object of this invention to provide a method and device for transferring accumulating articles off of an air conveyor. It is a further object of this invention to provide a method and device for temporarily storing articles which are accumulating on an air conveyor. It is still another object of this invention to provide a method and device for feeding articles onto an air conveyor.

These and other objects are achieved by provision of a device for transferring articles to and from an air conveyor. The device comprises a first plenum chamber, a second plenum chamber, and a means for supplying air to the plenum chambers. The first plenum chamber has a transfer surface with a first plurality of perforations for directing air toward the air conveyor. The second plenum chamber is located at least above a portion of the air conveyor and has a plate with a second plurality of perforations for directing air away from the air conveyor. The air supplying means supplying air to the first plenum chamber to keep articles going down the air conveyor and to feed articles onto the air conveyor, and supplying air to the second plenum chamber to transfer articles off of the air conveyor.

Preferably, the transfer surface of the first plenum chamber is located adjacent the air conveyor, and preferably also the second plenum chamber is located above the first plenum chamber. Means is preferably provided for sensing when articles stop moving and begin accumulating on the air conveyor; and, means is also preferably provided, responsive to the sensing means, for actuating the air supply means to provide air to the second plenum chamber for transferring articles accumulating on the air conveyor off of the air conveyor.

In another aspect, the invention relates to a device for temporarily storing articles accumulating on an air conveyor. In this regard a means for storing articles is provided; and a bidirectional means for transporting articles links the storage means and the article transfer device. Preferably, the storage means is a palletizer-depalletizer and the transporting means is a belt conveyor.

In yet another aspect, this invention relates to methods for transferring articles to and from an air conveyor with any of the above devices.

The invention and its particular features will become more apparent from the following Detailed Description of the Invention when considered with reference to the accompanying drawings.

DETAILED DESCRIPTION OF THE INVENTION

Figure 1:
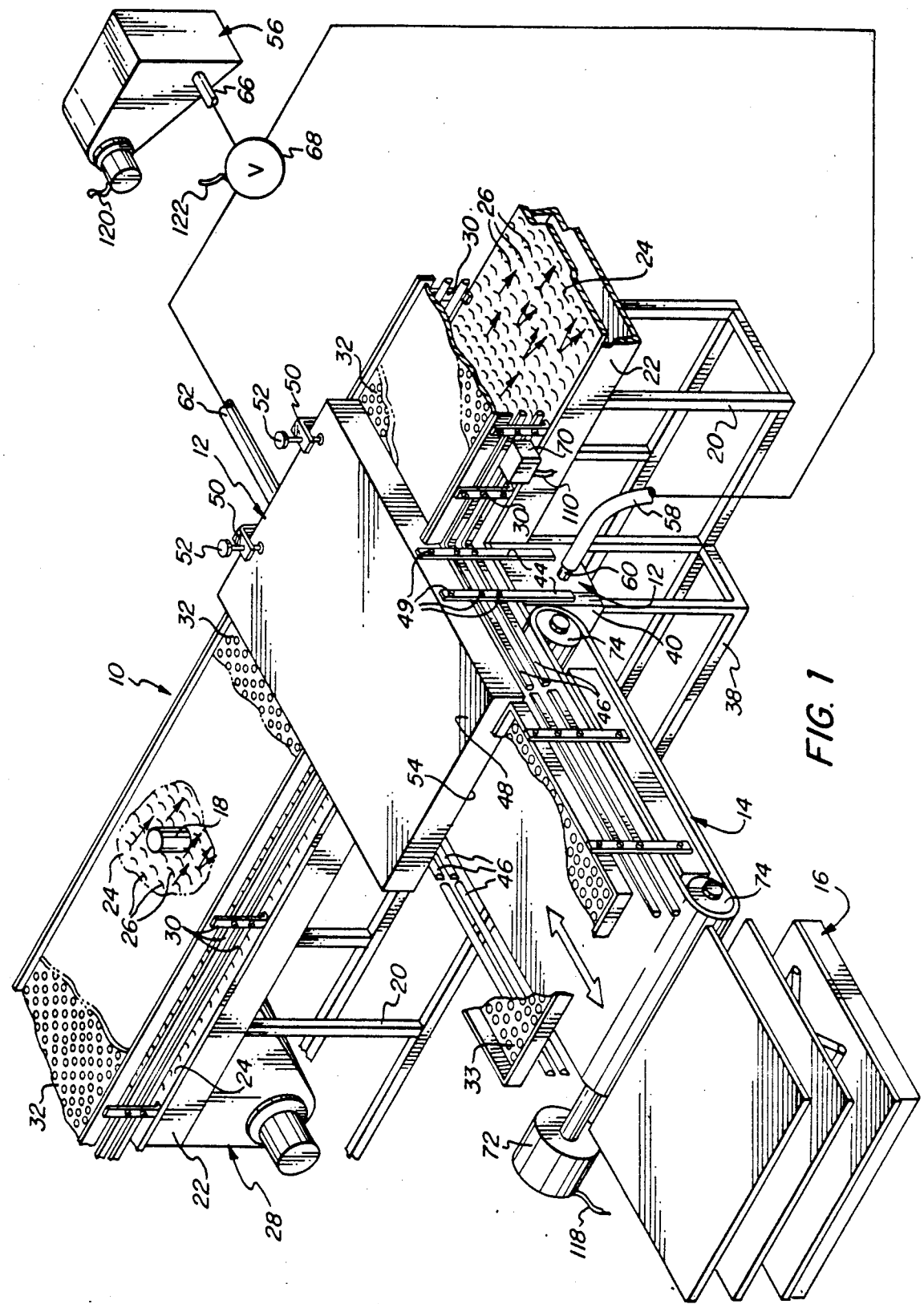
FIG. 1 is a front perspective view of an air conveyor incorporating a device in accordance with this invention for transferring articles to and from the air conveyor including a system for temporarily storing the transferred articles.

Referring to FIG. 1, an air conveyor 10 and an article transfer device 12 in accordance with this invention are generally shown. Article transfer device 12 is illustrated coupled to air conveyor 10, however, article transfer device 12 may conveniently be added to existing air conveyors 10. Further, article transfer device 12 may be added to either side of air conveyor 10.

Article transfer device 12 is illustrated coupled to a belt or like conveyor 14, which in turn is coupled to a palletizer or like article storage device 16. Article transfer device 12 is preferably used in conjunction with conveyor 14 and article storage device 16 in order to temporarily store articles, such as cans 18, as will be described hereinafter. Nonetheless, however, article transfer device 12 may function without conveyor 14 and article storage device 16 to simply transfer articles 18 off of air conveyor 10 for any of a variety of purposes.

Air conveyor 10 includes a frame or stand 20 which supports a plenum chamber 22 having a conveying surface 24. Conveying surface 24 includes a plurality of perforations or jets 26 formed in a known manner to direct air from plenum chamber 22 substantially in a single direction, as indicated by the arrows, in order to convey articles 18. Since perforations 26 are known in the art, they are schematically shown as arcs which roughly correspond to their actual shape.

A blower assembly or the like 28 is effective to pressurize plenum chamber 22 to provide a supply of air for jets 26. Finally, guide rails 30 and hold-downs 32 function to keep articles 18 upright and moving downstream along air conveyor 10. Further, hold-downs 32 are preferably positioned only slightly above articles 18, for example about one-eighth of one inch.

Article transfer device 12 includes a frame or stand 38 which supports a lower plenum chamber 40. Lower plenum chamber 40 has attached uprights 44 to which guide rails 46 and an upper plenum chamber 48 are fastened with screws or the like 49. Upper plenum chamber 48 is levelled by brackets 50 containing adjustable thumb screws 52. Brackets 50 are conveniently mounted to guide rails 30 of air conveyor 10 (see FIGS. 3 and 5).

A bottom side 54 of upper plenum chamber 48 preferably lies in about the same plane as hold-downs 32 and serves a similar function.

A blower assembly 56 supplies air to lower plenum chamber 40 of transfer device 12 via line 58 connected to a hose fitting 60. Blower assembly 56 similarly supplies air to upper plenum chamber 48 of transfer device 12 via line 62 connected to a hose fitting 64 (not shown, see FIGS. 3 and 4). Air is provided under pressure from blower assembly 56 at line 66 which leads to a manifold or like valve means 68 shown schematically. Valve 68 is controllable by a sensor 70 and any necessary associated circuitry to supply pressurized air primarily to either upper plenum chamber 48 or lower plenum chamber 40.

Sensor 70 is a motion sensor which preferably can detect when articles 18 are moving along air conveyor 10 and when they stop moving and begin accumulating on air conveyor 10. In normal operation, when articles 18 are moving, valve 68 directs pressurized air primarily, and preferably completely, to lower plenum chamber 40. When, however, articles 18 stop moving, valve 68 directs pressurized air primarily, and preferably completely, to upper plenum chamber 48.

Blower assembly 56 is shown detached from transfer device 12 for purposes of clarity. It is understood that the location of blower 56 is not critical and that it may conveniently be located beneath transfer device 12 similar to blower assembly 28 mounted beneath air conveyor 10.

Conveyor 14 and article storage device 16 are shown schematically as they are preferably, but not necessarily, used in conjunction with article transfer device 12. Most preferably, article storage device 16 is provided as a palletizer-depalletizer, and conveyor 14 is provided as a bidirectional belt conveyor driven by motor or the like 72. Preferably, also, conveyor 14 includes hold-downs 33 to stabilize articles conveyed thereon. Conveyor 14 circulates in either of two directions, as shown by the arrow, around axeled rollers 74. In this regard, conveyor 14 may convey articles 18 in a first direction from article transfer device 12 to article storage device 16 and in a second direction from article storage device 16 to article transfer device 12. Articles 18 transferred off of air conveyor 10 and onto conveyor 14 are transported to article storage device 16 where they may be palletized or otherwise stored. Articles 18 thus stored may also be depalletized by article storage device 16 and transported by conveyor 14 back to article transfer device 12 which may refeed them onto air conveyor 10.

In the event of a problem along air conveyor 10 downstream of article transfer device 12, articles 18 may be transferred off of air conveyor 10 and temporarily stored by a storage means such as article storage device 16 until such downstream problems may be rectified. This affords significant economies because although one step in an industrial process suffers downtime, many if not all upstream steps in the process may continue to function as before. Thus, in the future when one such upstream step malfunctions, articles temporarily stored may be fed onto the line permitting all downstream process steps to continue functioning.

Article transfer device 12 has three basic modes of operation: when articles are moving along air conveyor 10, when articles are being transferred off of air conveyor 10, and when articles are being fed onto air conveyor 10.

Figure 2:
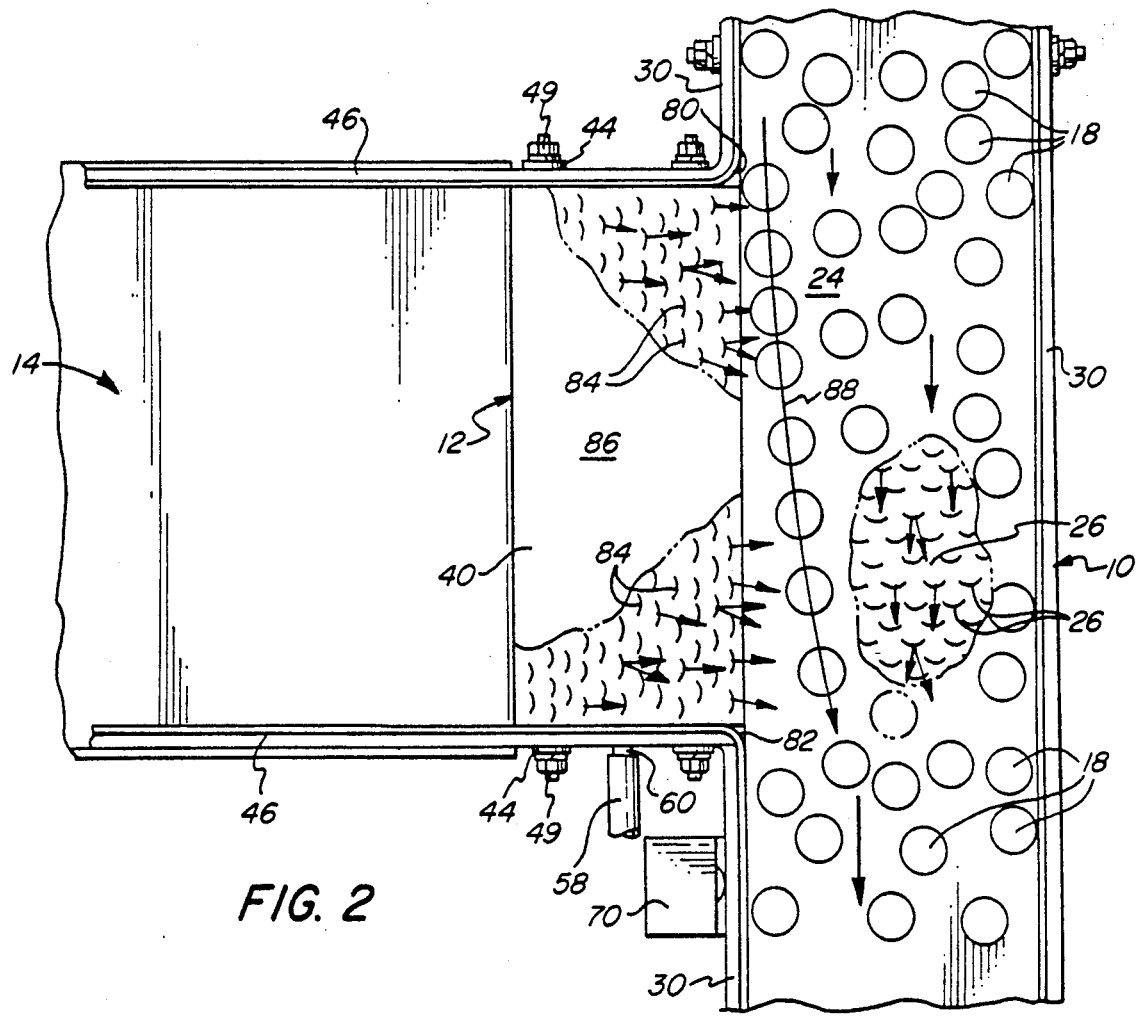
FIG. 2 is a top plan view with the upper plenum chamber removed revealing the air jets in the air conveyor and transfer device of FIG. 1 cooperating to move articles along the air conveyor.

Referring now to FIG. 2, a top plan view of article transfer device 12 and air conveyor 10, with upper plenum chamber 48 removed, reveals how articles 18 are moved along air conveyor 10. Articles 18 are moved downstream, as indicated by the arrows, by a relatively continuous supply of air directed through jets or perforations 26 formed in a known manner in conveying surface 24. The addition of article transfer device 12 to air conveyor 10 interrupts the otherwise relatively continuous guide rails 30 which prevent articles 18 from going off conveying surface 24 at either side.

Guide rails 30 along air conveyor 10 intersect with guide rails 46 of article transfer device 12 at both an upstream corner 80 and a downstream corner 82. Downstream corner 82 presents a particular problem in that articles 18 may with the absence of guide rails 30 drift into contact with corner 82 and be damaged. This possibility is substantially mitigated, however, by the arrangement of jets or perforations 84 in a transfer surface 86 on a top surface of lower plenum chamber 40. Jets 84 are arranged to direct air substantially toward, and preferably at about a 90° angle toward, air conveyor 10. This arrangement urges articles 18 away from corner 82 as shown by arrow 88 representing a hypothetical article trajectory. The density of articles on the conveyor, the incident angle of air from the transfer surface, the pressure of air from the transfer surface, and the mass of the articles are among the factors necessary to consider in order to prevent damage to articles 18 by corner 82.

Figure 3:
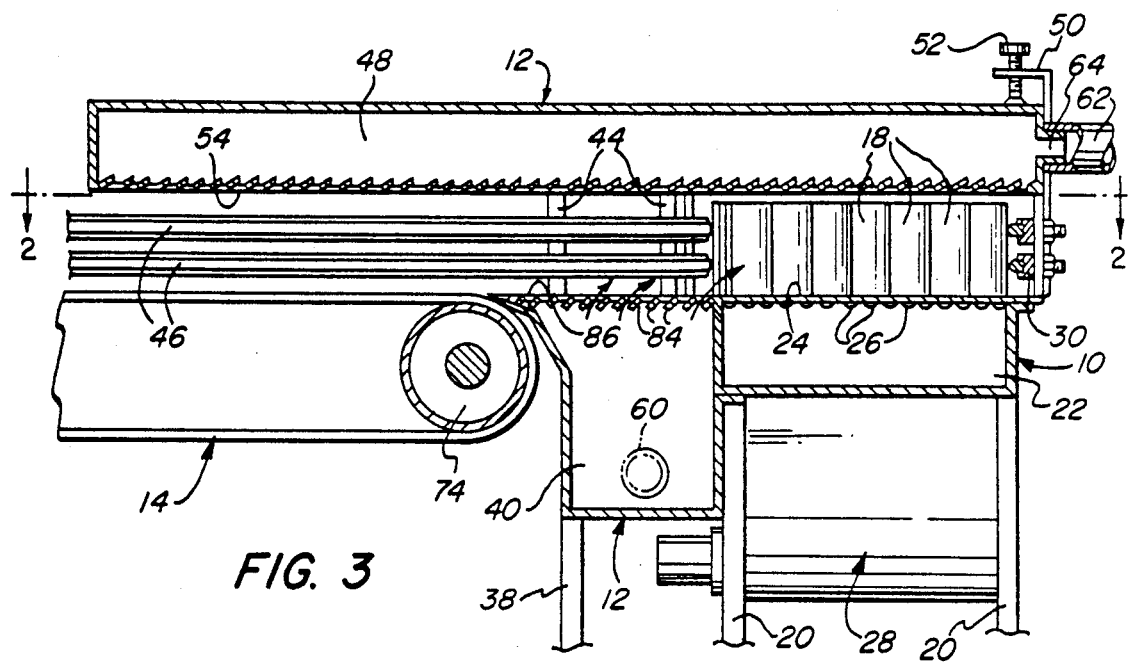
FIG. 3 is a side cross-sectional view of the air conveyor and transfer device of FIG. 1 as articles move along the air conveyor.

Referring now to FIG. 3, a side cross-sectional view of air conveyor 10 and article transfer device 12 is provided as articles 18 move along air conveyor 10. Jets 26 provide a flow of air from blower 28 through plenum chamber 22 to move articles 18 along air conveyor 10. Jets 84 of lower plenum chamber 40 simultaneously provide a flow of air, as indicated by the arrows, toward air conveyor 10 to prevent articles 10 from impacting corner 82 (not shown, see FIG. 2). At this time (in this mode of operation) substantially no air is being supplied to upper plenum chamber 48 or its perforated plate 54. The flow of air from jets 84 is directed substantially across transfer surface 86. By "across" is meant that the flow is directed at an angle of less than about 45° relative to transfer surface 86.

Figure 4:
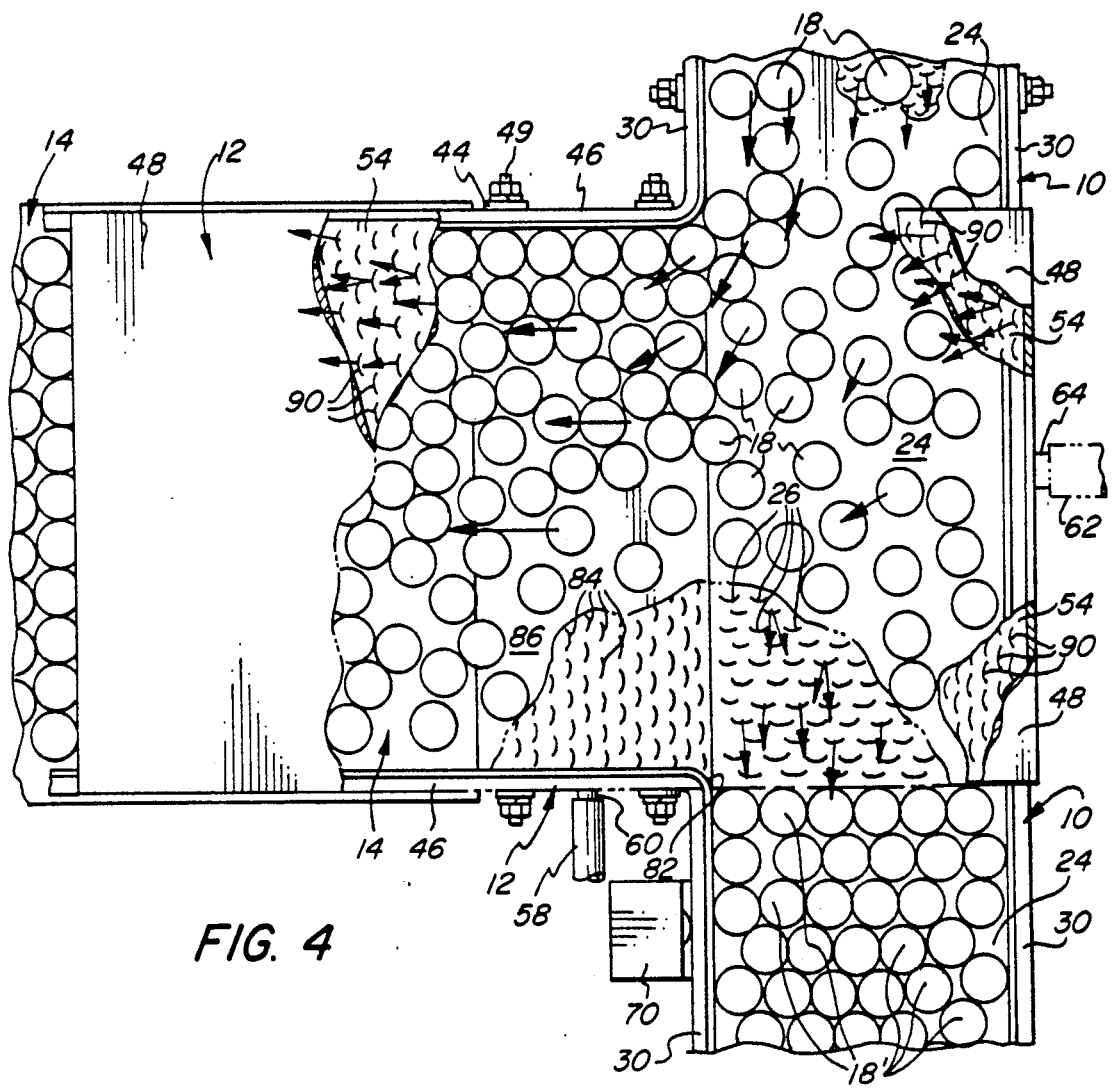
FIG. 4 is a top plan view partially cut away to reveal the air jets in the air conveyor and the transfer device of FIG. 1 cooperating to transfer articles off of the air conveyor.

Referring now to FIG. 4, a top plan view of article transfer device 12 and air conveyor 10 is partially cut away to reveal how articles 18 are transferred off of air conveyor 10. Articles 18 are transferred, as indicated by the arrows, by the combination of the relatively continuous supply of air through jets 26 in conveying surface 24 and jets or perforations 90 formed in a known manner in perforated plate 54 of upper plenum chamber 48 also as indicated by the arrows. It is understood that articles 18 may be transferred off of air conveyor 10 with jets 90 only. However, jets 26 are necessary to supply articles 18 to article transfer device. Jets 90 are arranged to direct air away from air conveyor 10, preferably in a direction substantially opposite jets 84, and most preferably at about a 90° angle away from air conveyor 10. Preferably also, jets 90 direct air substantially parallel to conveyor 14.

In transferring articles 18 off of air conveyor 10 there is generally little concern with intersecting corner 80, because articles are generally only transferred when sensor 70 determines that they are accumulating, i.e. have stopped moving, on air conveyor 10—presumably due to a downstream problem. In any event, since articles 18' are backed up to corner 82, transferring articles 18 will generally slide along backed-up articles 18' as they would guide rails 30 and 46.

In this transfer mode, substantially no air is being supplied to lower plenum chamber 40 or its transfer surface 86 with jets 84. Articles 18 are transferred off of air conveyor 10, over transfer surface 86, and onto conveyor 14 by jets 90 in perforated plate 54 located on a bottom surface of upper plenum chamber 48. Returning briefly to FIG. 1, upon determining at sensor 70 that articles are backing-up, the pressurized air supply is switched at valve 68 from lower plenum chamber 40 via line 58 to upper plenum chamber 48 via line 62, and articles 18 begin transferring off of air conveyor 10.

Figure 5:
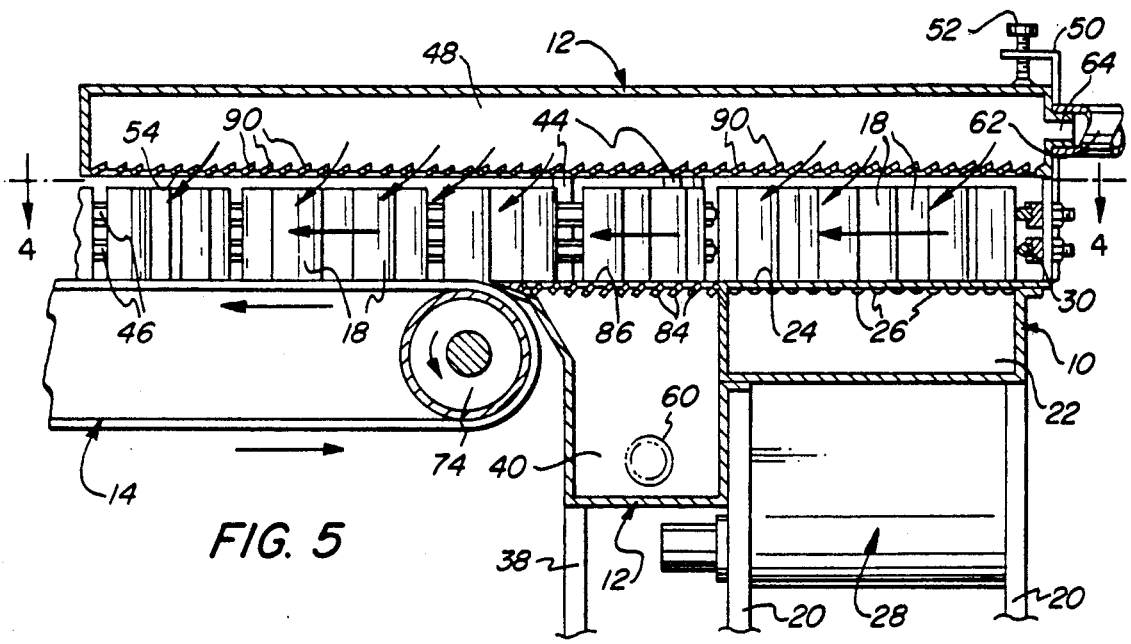
FIG. 5 is a side cross-sectional view of the air conveyor and transfer device of FIG. 1 as articles are transferred off of the air conveyor.

Referring now to FIG. 5, a side cross-sectional view of air conveyor 10 and article transfer device 12 is provided as articles 18 are transferred off of air conveyor 10. As described in conjunction with FIG. 4, articles 18 are transferred off of air conveyor 10. As described in conjunction with FIG. 4, articles 18 are transferred indicated by the arrows by a flow of air from jets 90 also indicated by the arrows in upper plenum chamber 48. In this mode substantially no air is being supplied to lower plenum chamber 40 or its transfer surface 86. The flow of air from jets 90 is directed, like the flow from jets 84, substantially across perforated plate 54. Also in transfer mode, conveyor 14 moves in the first direction to transport articles 18 from air conveyor 10 to article storage device 16 (see FIG. 1). The direction of operation of conveyor 14 is controlled by sensor 70 and any necessary associated circuitry.

Figure 6:
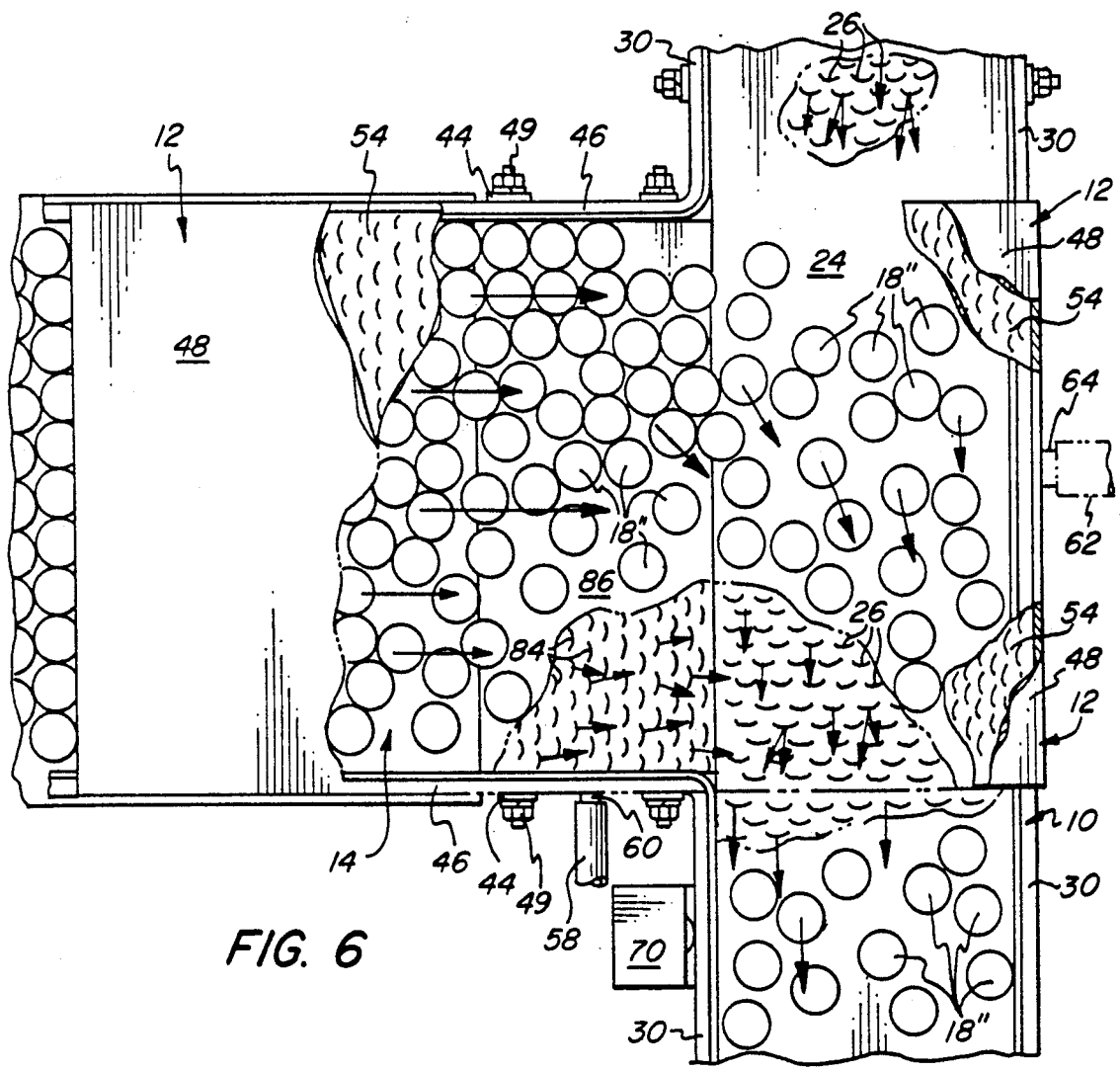
FIG. 6 is a top plan view partially cut away to reveal the air jets in the air conveyor and the transfer device of FIG. 1 cooperating to feed articles onto the air conveyor.

Referring now to FIG. 6, a top plan view of article transfer device 12 and air conveyor 10 is partially cut away to reveal now articles 18" which have been temporarily stored in article storage device 16 or the like are fed back onto air conveyor 10. Articles 18" are returned, as indicated by the arrows, by the combination of the relatively continuous supply of air through jets 26 in conveying surface 24 as indicated by arrows and jets 84 in transfer surface 86 also as indicated by arrows.

In this refeeding mode, substantially no air is being supplied to upper plenum chamber 48 or its perforated plate 54 with jets 90. Articles 18" are transported from article storage device 16 (see FIG. 1) in the second direction back to transfer surface 86 of article transfer device 12. Returning briefly to FIG. 1, upon determining at sensor 70 that articles are no longer backing-up down-stream: 1) the pressurized air supply is switched at valve 68 from upper plenum chamber 48 via line 62 to lower plenum chamber 40 via line 58, 2) conveyor 14 is switched to the second direction, and 3) articles 18" begin feeding back onto air conveyor 10. It is understood that in feed mode article transfer device 12 may feed articles onto air conveyor 10 in many situations which do not include conveyor 14 or article storage device 16.

Figure 7:
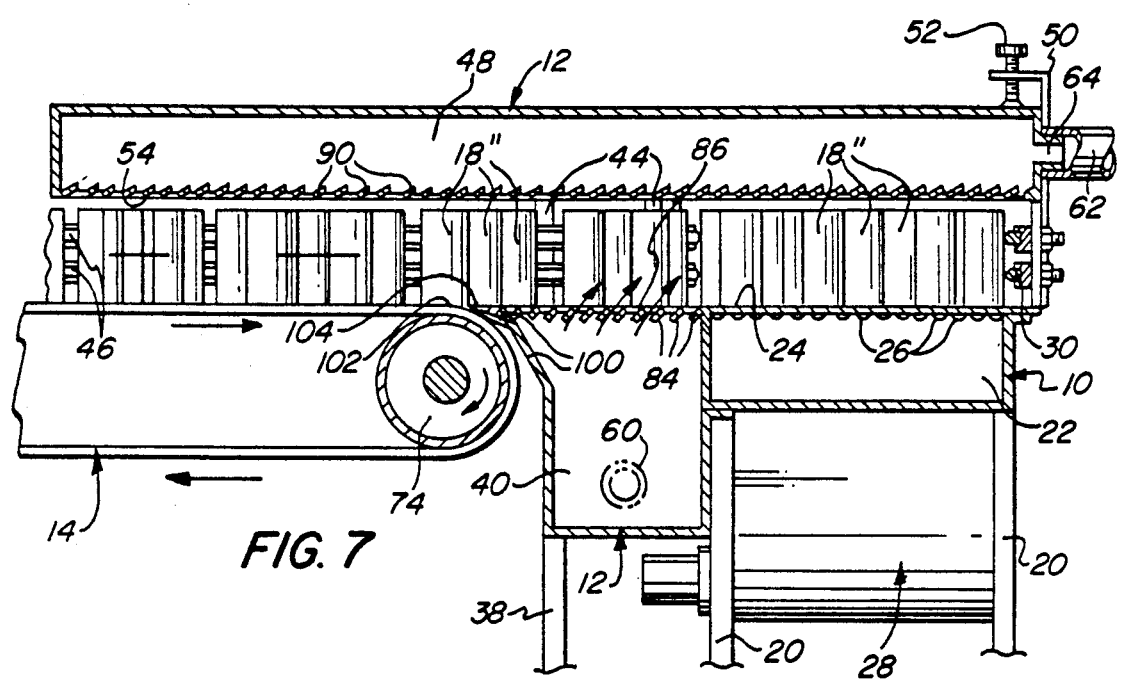
FIG. 7 is a side cross-sectional view of the air conveyor and transfer device of FIG. 1 as articles are fed onto the air conveyor.

Referring now to FIG. 7, a side cross-sectional view of air conveyor 10 and article transfer device 12 is provided to reveal additional detail as articles 18" are refed onto air conveyor 10. In order to provide the smoothest possible transfer of articles 18" from conveyor 14 to transfer surface 86, a "bird's beak" structure 100 is provided in lower plenum chamber 40. Bird's beak 100 serves to bring jets 84 in transfer surface 86 as close as possible to the effective end 102 of conveyor 14. Without bird's beak 100, articles 18" may tend to accumulate at transition point or dead plate 104 between conveyor 14 and transfer surface 86.

Figure 8:
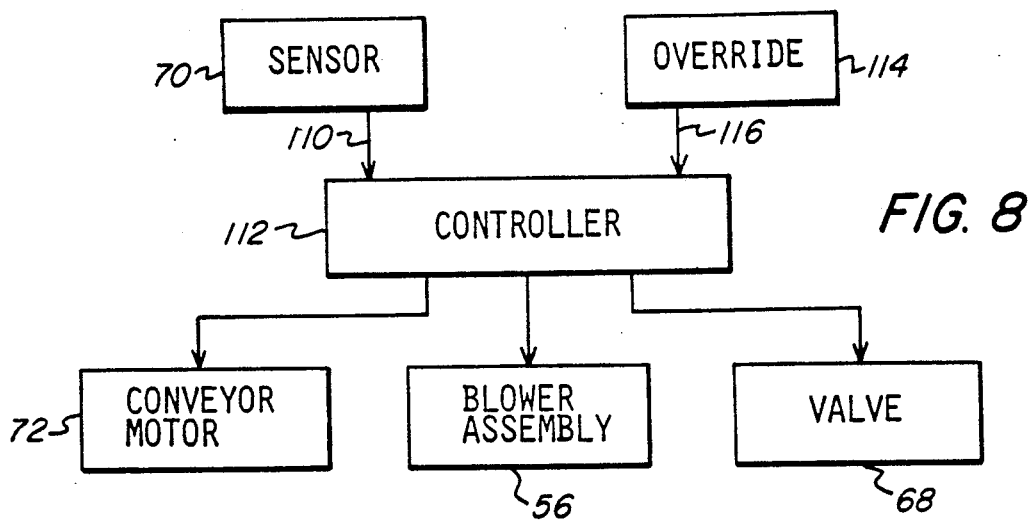
FIG. 8 is a schematic diagram of the controls used to operate the transfer device of FIG. 1.

Referring now to FIG. 8, a schematic diagram of a control system 108 used to operate article transfer device 12 is shown. In discussing FIG. 8, it is helpful to refer also to FIG. 1. Sensor 70 provides the main system input along line 110. Control circuitry depicted at 112 may be integral with sensor 70 and thus is not shown in FIG. 1. Also not shown in FIG. 1 is an override switch 114 which may serve along line 116 to operate article transfer device 12 in either an emergency or a control system breakdown. Conveyor motor 72, blower assembly 56 and valve 68 are each controlled, primarily by input from sensor 70 along respective lines 118, 120 and 122.

Figure 9:
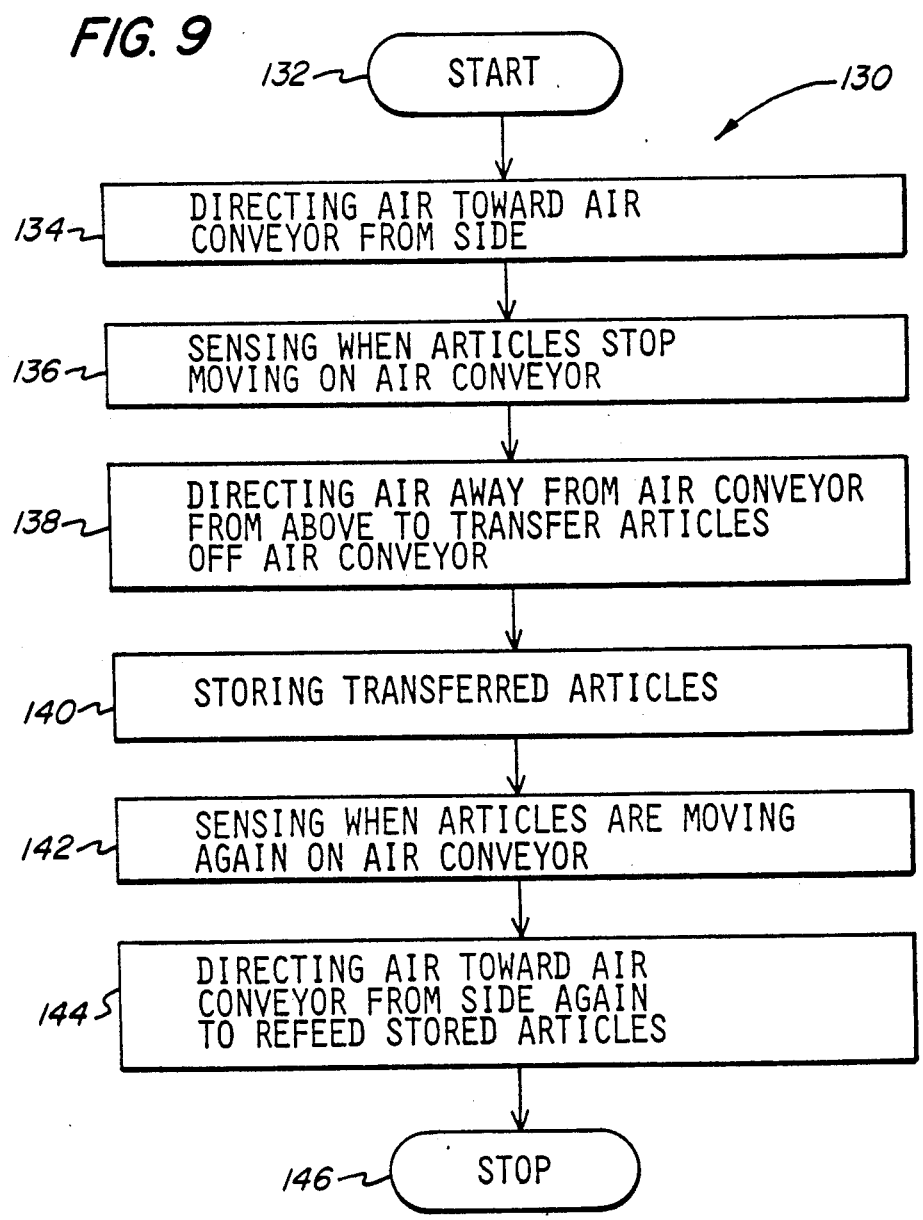
FIG. 9 is a flow diagram illustrating a method of temporarily storing articles accumulating on an air conveyor employed by the transfer device of FIG. 1.

Referring now to FIG. 9, a flow diagram illustrates a method 130 of temporarily storing articles accumulating on an air conveyor employed by article transfer device 112. Method 130 starts at 132 and continues at 134 where air is directed toward air conveyor 10 by jets 84 to aid in moving articles 18 along air conveyor 10. At 136, sensor 70 determines that articles 18' have begun accumulating on air conveyor 10. In response to sensor 70, air is directed at 138 away from air conveyor 10 from above to transfer articles off of air conveyor 10. Thus, it is understood that a method of transferring articles 18 off of air conveyor 10 is disclosed by steps 134, 136 and 138. At 140 transferred articles are stored in article storage device 16. At 142, sensor 70 determines that articles are again moving along air conveyor 10. In response to sensor 70, air is again directed toward air conveyor 10 by jets 84—this time serving the additional purpose of feeding temporarily stored articles 18" back onto air conveyor 10. Method 130 stops at 146.

Although the invention has been described with reference to the particular embodiments, features, materials of construction and the like, these are not intended to exhaust all possible features, and indeed many other modifications and variations will be ascertainable to those of skill in the art.

What is claimed is:

1. A device for use with an air conveyor to temporarily store articles which are accumulating on the air conveyor comprising:
   means for storing articles;
   a first plenum chamber having a transfer surface adjacent to and intersecting the air conveyor;

a first plurality of perforations in said transfer surface for directing air across said transfer surface toward the air conveyor to prevent articles on the air conveyor from impacting the intersection of the air conveyor with said first plenum chamber;

means, located between said first plenum chamber and said storage means, for transporting articles in a first direction from the transfer surface to said storage means and in a second direction from said storage means to the transfer surface;

a second plenum chamber located above said first plenum chamber;

a plate having a second plurality of perforations for directing air substantially across said plate, said plate located on said second plenum chamber so that it faces said transfer surface, so that it is above a portion of the air conveyor, and so that said second perforations direct air away from the air conveyor and toward said transporting means;

means for supplying air under pressure;

means for alternately switching pressurized air from said air supply means to either said first plenum chamber or said second plenum chamber;

means located on the air conveyor for sensing when articles are moving and when articles stop moving and begin accumulating on the air conveyor; and means responsive to said sensing means for actuating said transporting means in said first direction and for actuating said switching means to supply pressurized air to said second plenum chamber when articles stop moving on the air conveyor whereby accumulating articles may be stored in said storage means, said actuating means further for actuating said transporting means in said second direction and for actuating said switching means to supply pressurized air to said first plenum chamber when articles are again moving on the air conveyor whereby articles stored in said storage means may be returned to the air conveyor.

2. The device of claim 1 wherein said article storing means comprises a palletizer-depalletizer.

3. The device of claim 1 wherein said article transporting means comprises a bidirectional belt conveyor.

4. The device of claim 1 wherein said plurality of perforations in said transfer surface direct air toward the air conveyor substantially at a right angle to the air conveyor.

5. The device of claim 1 wherein said second plurality of perforations in said plate direct air away from the air conveyor substantially at a right angle to the air conveyor.

6. The device of claim 1 wherein said second plurality of perforations in said plate direct air substantially parallel to the first direction.

7. The device of claim 6 wherein said second plurality of perforations in said plate also direct air substantially parallel to the second direction.

8. A device for use with an air conveyor to transfer accumulating articles off of the air conveyor comprising:

a first plenum chamber having a transfer surface adjacent the air conveyor;

a first plurality of perforations in said transfer surface, said first perforations for directing air toward the air conveyor substantially at a right angle to the air conveyor;

a second plenum chamber located above said first plenum chamber;

a plate having a second plurality of perforations for directing air, said plate located on said second plenum chamber so that it faces said transfer surface, so that it is above a portion of the air conveyor, and so that said second perforations direct air away from the air conveyor;

means for alternately supplying air under pressure to said first and second plenum chambers;

means located on the air conveyor for sensing when articles stop moving and begin accumulating on the air conveyor; and means responsive to said sensing means for actuating said alternate supply means to supply pressurized air to said second plenum chamber when articles stop moving on the air conveyor whereby accumulated articles may be transferred off of the air conveyor.

9. The device of claim 8 wherein said sensing means also senses when articles are moving on the air conveyor and wherein said actuating means also actuates said alternate supply means to supply air to said first plenum chamber to transfer articles onto the air conveyor.

10. The device of claim 9 comprising a palletizer-depalletizer located adjacent said transfer surface for temporarily storing accumulating articles transferred from the air conveyor and for refeeding stored articles back to the air conveyor when articles are moving again on the air conveyor.

11. The device of claim 10 comprising means, located between said transfer surface and said palletizer-depalletizer, for transporting articles therebetween.

12. The device of claim 8 comprising a palletizer located adjacent the transfer surface for storing articles transferred off of the air conveyor.

13. The device of claim 8 wherein said second plurality of perforations in said plate direct air away from the air conveyor substantially at a right angle to the air conveyor.

14. The device of claim 8 wherein said first and second pluralities of perforations direct air in substantially opposite directions.

15. A device for use with an air conveyor to transfer articles on or off the air conveyor comprising:

a first plenum chamber having a transfer surface adjacent the air conveyor;

a first plurality of perforations in said transfer surface for directing air toward the air conveyor;

a second plenum chamber having a plate located above a portion of the air conveyor, said plate having a plurality of perforations for directing air away from the air conveyor; and means for supplying air under pressure to said first plenum chamber when articles are moving along the air conveyor whereby articles may continue along the air conveyor and may be transferred onto the air conveyor, said air supplying means further for supplying air under pressure to said second plenum chamber whereby articles may be transferred off of the air conveyor.

16. The device of claim 15 wherein said plurality of perforations in said transfer surface direct air toward the air conveyor substantially at a right angle to the air conveyor.

17. The device of claim 15 wherein said second plurality of perforations in said plate direct air away from the air conveyor substantially at a right angle to the air conveyor.

18. The device of claim 15 wherein said second plenum chamber is also located above the first plenum chamber such that said plate is facing and opposite said transfer surface.

19. The device of claim 15 wherein said first and second pluralities of perforations direct air in substantially opposite directions.

20. A method of transferring articles accumulating on an air conveyor off of the air conveyor:
   directing air toward the air conveyor from a side of the air conveyor to prevent articles moving along the air conveyor from transferring off of the air conveyor;
   sensing when articles stop moving and begin accumulating on the air conveyor;
   directing air laterally away from the air conveyor form above the air conveyor to transfer accumulating articles off of the air conveyor;
   storing the accumulating articles transferred off of the air conveyor;
   sensing when articles are moving on the air conveyor; and
   directing air toward the air conveyor from a side of the air conveyor for feeding stored articles back onto the air conveyor.

21. A method of transferring articles accumulating on an air conveyor off of the air conveyor:
   directing air toward the air conveyor from a side of the air conveyor to prevent articles moving along the air covneyor from transferring off of the air conveyor;
   sensing when articles are accumulating on the air conveyor; and
   directing air laterally away from the air conveyor from above the air conveyor to transfer accumulating articles off of the air conveyor.

22. A method of transferring articles accumulating on an air conveyor off of the air conveyor:
   directing air toward the air conveyor from a side of the air conveyor to prevent articles moving along the air conveyor form transferring off of the air conveyor;
   sensing when articles stop moving and begin accumulating on the air conveyor;
   directing air laterally away from the air conveyor from above the air conveyor to transfer accumulating articles off of the air conveyor;
   sensing when articles are moving on the air conveyor; and
   directing air toward the air conveyor from a side of the air conveyor for feeding articles back onto the air conveyor.

23. A device for use with an air conveyor to transfer articles off of the air conveyor comprising:
   a first plenum chamber having a transfer surface adjacent the air conveyor;
   a first plurality of perforations in said transfer surface, said first perforations for directing air toward the air conveyor to prevent articles from transferring off of the air conveyor;
   a second plenum chamber located above said first plenum chamber;
   a plate having a second plurality of perforations for directing air, said plate located on said second plenum chamber so that it faces said transfer surface, so that it is above a portion of the air conveyor, and so that said second perforations direct air away from the air conveyor to transfer articles beneath said plate over said transfer surface and off of said air conveyor; and
   means for supplying air under pressure to either said first or said second plenum chamber.

24. The device of claim 23 including means located on the air conveyor for sensing when articles are accumulating on the air conveyor, and means responsive to said sensing means for actuating said alternate supply means to supply pressurized air to said second plenum chamber whereby accumulated articles may be transferred off of the air conveyor.

* * * * *